J. W. BREESE.
Improvement in Grain-Separators for Thrashing-Machines.
No. 126,670.  Patented May 14, 1872.
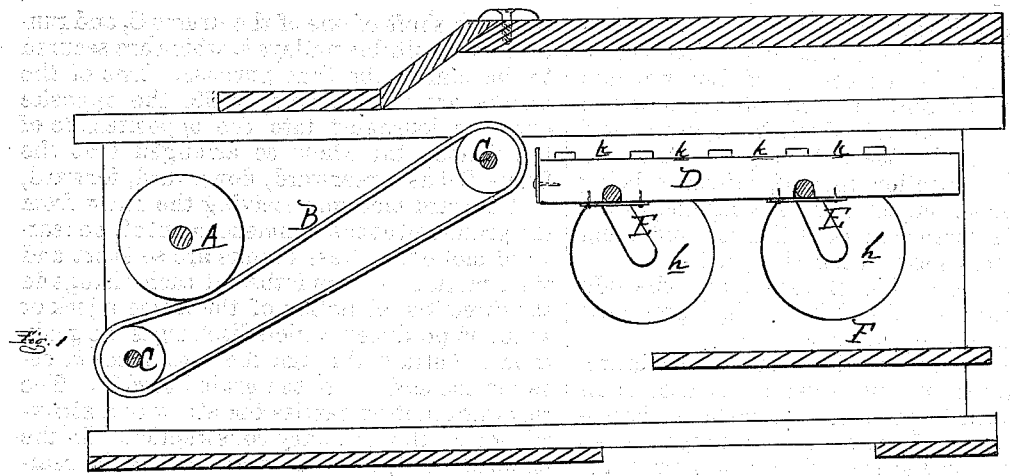
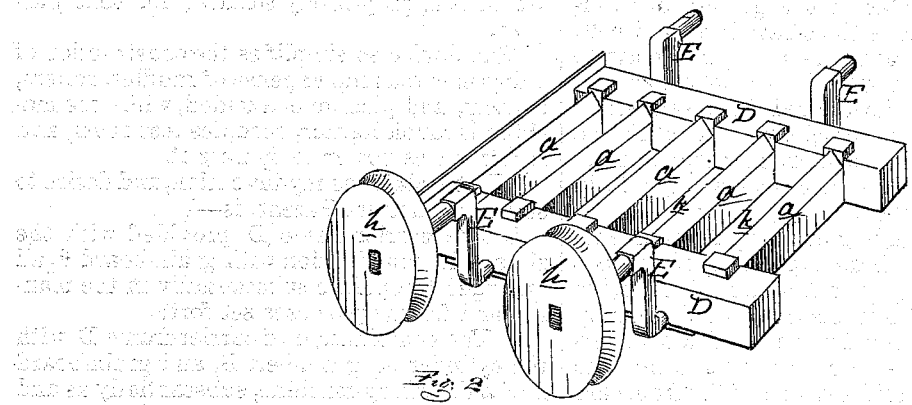
ATTEST  
INVENTOR

UNITED STATES PATENT OFFICE.

JACOB W. BREESE, OF CANANDAIGUA, MICHIGAN.

IMPROVEMENT IN GRAIN-SEPARATORS FOR THRASHING-MACHINES.

Specification forming part of Letters Patent No. 126,670, dated May 14, 1872.

*To all whom it may concern:*

Be it known that I, JACOB W. BREESE, of Canandaigua, in the county of Lenawee and State of Michigan, have invented a new and useful Improvement in Grain-Separators; and I do declare that the following is a true and accurate description thereof, reference being had to the accompanying drawing and to the letters of reference marked thereon and being a part of this specification, in which—

Figure 1 is a side elevation with the side frame removed. Fig. 2 is a perspective view of my attachment detached.

Like letters refer to like parts in each figure.

The nature of this invention relates to an improvement in grain-separators and thrashers, by means of which the grain is most effectually separated from the straw after it has been operated upon by the cylinder. The invention consists in the peculiar construction and operation of a combined beater, carrier, and rake in the rear of the grain-belt, so arranged as to receive the straw from said belt, to beat out the grain mixed with the straw, to carry the straw back to the straw-carrier, and to rake the grain discharged from said straw to the fanning-mill or cleaner; also, in the combination of said beater, carrier, and rake with any thrashing-machine, as more fully hereinafter described.

In the accompanying drawing, A represents the cylinder of a thrashing-machine, and B a grain-belt running over its drums C to receive the straw after it has been operated upon by the cylinder. D is a frame provided with vertical slats or cross-ties $a$, so arranged that the lower face of the said ties and of the frame are on the same plane. This frame with its slats, as described, forms the beater, carrier, and rake, and is hung upon four cranks, E, one at each corner of the frame, said cranks being journaled into or through the sides of the machine, where they are driven by suitable belts from the shaft of one of the drums C, and running over suitable pulleys $h$, which are secured to the cranks for that purpose. Two of the cranks are thus driven, while the opposite ones are journaled into the opposite side of the frame; the whole so arranged that the frame D has a rearward, downward, forward, and upward motion, receiving the straw from the grain-belt at the commencement of the rearward motion. These cranks are so short and their motion so rapid that at each change in the direction of motion of the frame a jerk or shake is produced, which discharges the grain from the straw, through the interstices $k$, between the slats, onto the grain-board F. The rearward motion carries the straw to a straw-carrier of the ordinary construction. In the forward motion of the frame, after the rearward and downward motions have been had, the frame moves on the grain-board, raking or drawing the grain thereon to the fanning-mill, which is appropriately situated for that purpose.

This device so simplifies the construction of a thrasher that the expense of raddles, rollers, beaters, and pickers is avoided, while the machine is much lighter, occupies less room, and requires less power to operate it.

What I claim as my invention, and desire to secure by Letters Patent, is—

1. The carrier-frame D provided with the slats $a$, in combination with grain-board F, all arranged to operate substantially in the manner and for the purposes set forth.

2. The combination of carrier-frame D with the cylinder A, grain-belt B, and grain-board F of a thrashing-machine, substantially as and for the purposes set forth.

JACOB W. BREESE.

Witnesses:
THOS. S. SPRAGUE,
MYRON H. CHURCH.